United States Patent
Siraky

(10) Patent No.: US 7,041,961 B2
(45) Date of Patent: May 9, 2006

(54) DEVICE FOR MEASUREMENT OF ROTATIONAL ANGLE OF TWO COMPONENTS RELATIVE TO EACH OTHER

(75) Inventor: Josef Siraky, Donaueschingen (DE)

(73) Assignee: Sick Stegmann GmbH, Donaueschingen (DE)

(*) Notice: Subject to any disclaimer, the term of this patent is extended or adjusted under 35 U.S.C. 154(b) by 136 days.

(21) Appl. No.: 10/786,602

(22) Filed: Feb. 26, 2004

(65) Prior Publication Data

US 2004/0183001 A1    Sep. 23, 2004

(30) Foreign Application Priority Data

Feb. 27, 2003  (DE) ................................ 103 08 440

(51) Int. Cl.
*G01D 5/34*  (2006.01)

(52) U.S. Cl. .......................... 250/231.13; 250/231.18; 33/1 N

(58) Field of Classification Search ........... 250/231.13, 250/231.14, 231.16–231.18
See application file for complete search history.

(56) References Cited

U.S. PATENT DOCUMENTS

| | | | |
|---|---|---|---|
| 4,100,420 A | | 7/1978 | Metcalf et al. |
| 4,387,374 A | * | 6/1983 | Wiener .................. 342/183 |
| 4,421,980 A | * | 12/1983 | Kuhne .................. 250/231.18 |
| 4,866,269 A | * | 9/1989 | Wlodarczyk et al. .. 250/231.18 |
| 5,686,804 A | * | 11/1997 | Siraky .................. 318/640 |
| 6,356,219 B1 | * | 3/2002 | Weibel, IV et al. ......... 341/120 |

FOREIGN PATENT DOCUMENTS

| | | |
|---|---|---|
| DE | 3035012 A1 | 4/1982 |
| DE | 42 43 778 | 6/1994 |
| DE | 44 02 401 | 8/1995 |
| DE | 4402401 A1 | 8/1995 |
| DE | 19748292 A1 | 5/1999 |
| DE | 19750474 A1 | 6/1999 |
| EP | 1 045 227 A1 | 10/2000 |

* cited by examiner

Primary Examiner—Stephone B. Allen
Assistant Examiner—Suezu Ellis
(74) Attorney, Agent, or Firm—Nath & Associates PLLC; Gregory B. Kang; Teresa M. Arroyo

(57) ABSTRACT

A device for measuring the rotational angle of two components that can be rotated relative to each other has a shaft that can be securely coupled to the first component, and coaxially houses a light source and a materialized measure through which the light source shines. A sensing device can be securely coupled to the second component. The interior measure has an angular lattice structure and the sensing device has a coaxially arranged circular track of optical sensor elements, by means of which incremental angle measurement is possible. At least one marker element is also provided on the materialized measure that influences the sensor element corresponding to its absolute angle position. The sensor elements can be electronically polled individually in order to determine the absolute angle position.

11 Claims, 2 Drawing Sheets

Figure 1:
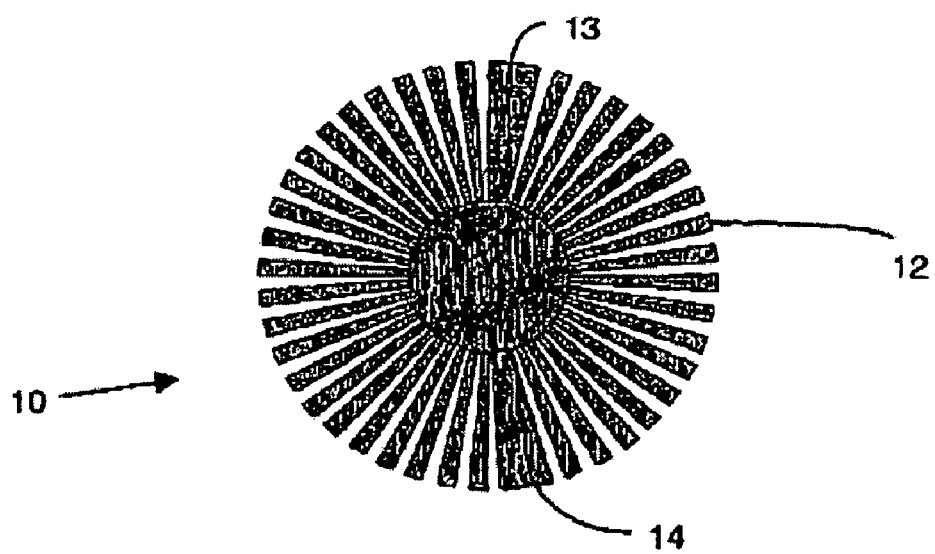

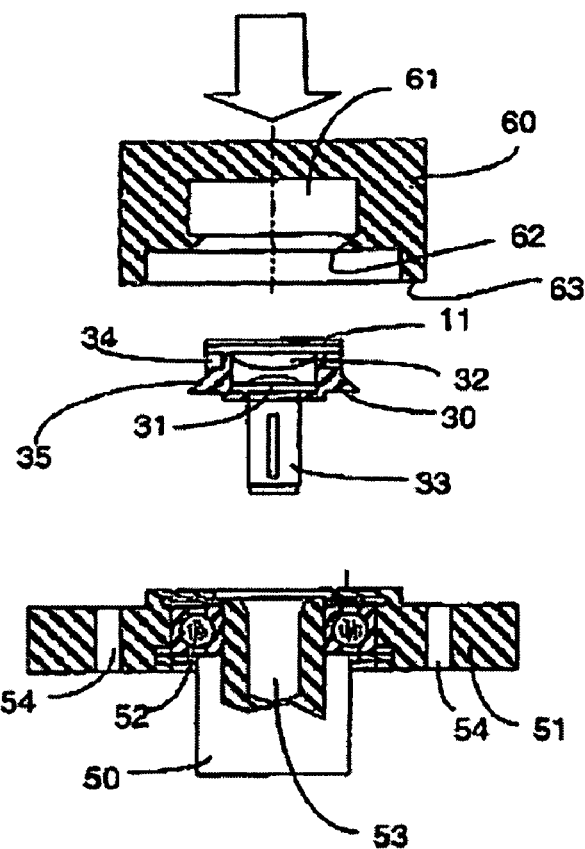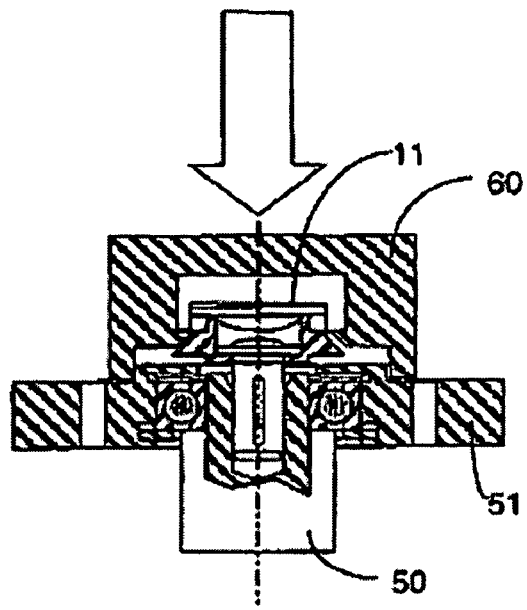
Fig. 4
Fig. 5
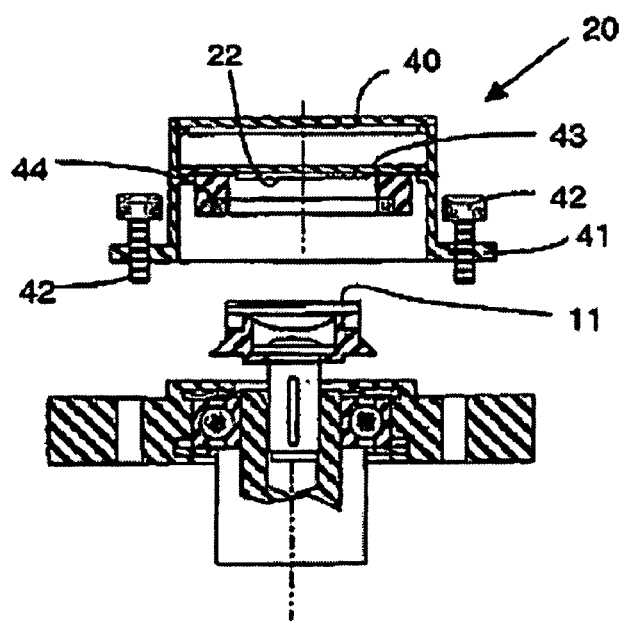
Fig. 6

DEVICE FOR MEASUREMENT OF ROTATIONAL ANGLE OF TWO COMPONENTS RELATIVE TO EACH OTHER

The invention concerns a device for measuring the rotational angle of two components that can be rotated relative to each other, according to the preamble of Claim 1.

Optical rotation sensors, in which a materialized measure rotates with the shaft of the rotational sensor, are used to measure the rotational angle of two components that can be rotated relative to each other, for example, the shaft of a motor relative to the motor housing. The materialized measure is exposed to radiation from a light source, with a light-sensitive sensing device receiving the light of the light source modulated by the materialized measure.

It is known from DE 197 50 474 A1 and from DE 100 63 899 A1 to arrange the light source in such a rotation sensor axially centered in the shaft of the rotation sensor and to illuminate the entire materialized measure concentric to the axis of the shaft. In this way a particularly compact design of the rotation sensor is obtained with particularly limited radial dimensions. The materialized measure in this known rotation sensor has an outer incremental track that is sensed by a circular track of optical sensor elements of the sensing device in order to generate incremental sine and cosine signals. The materialized measure also has digitally coded tracks that are sensed in the sensing device in order to obtain the absolute angular position of the materialized measure and therefore the shaft in a digitally coded data element.

The digitally coded sensing of the absolute angular position makes high precision necessary in mutual centering of the materialized measure and sensing device. High centering accuracy can only be reliably maintained in internally supported rotation sensors where the sensing device and the shaft with the materialized measure are mutually supported by means of precision bearings. This requires, on the one hand, construction expense for the rotation sensor and, on the other hand, an assembly of the rotation sensor on the components being measured which takes up the larger bearing tolerances of these components.

The underlying task of the invention is to create a device for measuring the rotational angle of two components that can be rotated relative to each other which permits lesser centering requirements for the materialized measure and sensing.

This task is solved according to the invention by a device with the features of Claim 1.

Advantageous variants of the invention are mentioned in the dependent claims.

The device according to the invention has a materialized measure to measure the rotational angle which is fully illuminated optically, for example, by means of a central source in transmitted light or reflected light. The materialized measure, for example, an angular lattice structure, is sensed by a coaxially arranged circular track of optical sensor elements. This sensing produces an incremental angle measurement. In known fashion, the incremental angle measurement signals have the shape of sine and cosine signals so that a higher angular resolution of the incremental angle measurement is possible by interpolation of the signal voltages.

According to the invention, the absolute angle position is not measured by digitally coded additional tracks of the materialized measure and additional sensing. Instead, the optical sensor elements of the circular track, which is used for incremental angle measurement, are also used simultaneously for absolute angle measurement, in which case a marker element rotating with the shaft modulates the light impinging on the sensor elements. The sensor elements of the circular track of the sensing device can be polled individually, so that the corresponding position of the marker element and therefore the corresponding angle position of the shaft can be determined by polling the sensor elements. In an advantageous variant of the invention, the marker element is designed as an irregularity in the otherwise regular angular lattice structure. Because of this, the angular lattice structure of the materialized measure for incremental angle measurement and the marker element for absolute angle measurement can be made on a common disk in the same optical structure.

Determination of the absolute angle position by polling the circularly arranged sensor elements produces a distinct absolute angle measurement that permits large tolerances with reference to centricity and to axial alignment of sensing with the shaft with the materialized measure. The centricity tolerances are only restricted by the fact that the marker element can still be uniquely associated with one sensor element of the sensing. Based on the admissible large tolerances with reference to centricity and axial alignment, the device according to the invention no longer relies on internal support of sensing and the materialized measure. The shaft with the materialized measure can be fixedly mounted on one component and the sensing [means] on the other component. The usual bearing tolerances of the two components that are rotatable relative to each other, for example, the shaft of an electric motor relative to the motor housing, can be absorbed by the rotation sensor according to the invention without leading to incorrect measurements. Since no internal bearing is necessary, the rotation sensor according to the invention is on the one hand simpler and therefore more cost-effective, and on the other hand more compact, and can therefore be designed for more versatile use.

If only one marker element is provided, incorrect readings in absolute angle measurement can be produced if a strong eccentricity is present in a direction offset by 90° relative to the marker element. To rule out such incorrect readings, a second marker element is preferably provided, which is offset relative to the first marker element by an angle. During central arrangement of the shaft and sensing device within the admissible tolerances, the same angular spacing is obtained in the sensor elements of the sensing device that the marker elements exhibit. At an eccentricity surpassing the admissible tolerances, the sensor elements of the sensing device have an angular spacing deviating from the angular spacing of the marker elements, from which the eccentricity can be recognized. The most favorable arrangement of the marker elements is an angle that is somewhat less than 180°. An angle as close as possible to 180° gives the most distinct indication of eccentricity, in which the direction of eccentricity is also recognized by the deviation from 180°.

Since no internal bearing of the rotation sensor according to the invention is required, the shaft with the materialized measure and the sensing device can be mounted independently of each other on the two components being measured in angular position. The radial ball bearing tolerances of these components are then tolerated by the rotation sensor. In order to axially align the materialized measure and sensing relative to each other, the shaft of the rotation sensor is preferably designed as a shaft stub that is fastened axially aligned in the corresponding component. This can occur, for example, in that the shaft is axially screwed into the corresponding component. A particularly simple and accurate axial alignment is obtained if the shaft is designed as an expanding shaft that is force-fit into the corresponding component. In this variant, the sensing device can be arranged in a cap that is mounted on the corresponding component. The shaft with the materialized measure is force-fit by means of a tool that corresponds in shape to the cap of the sensing device. Because of this, the shaft with the materialized measure is necessarily brought into an axial position that is axially aligned with reference to the subsequently mounted sensing device.

Figures 2, 3:
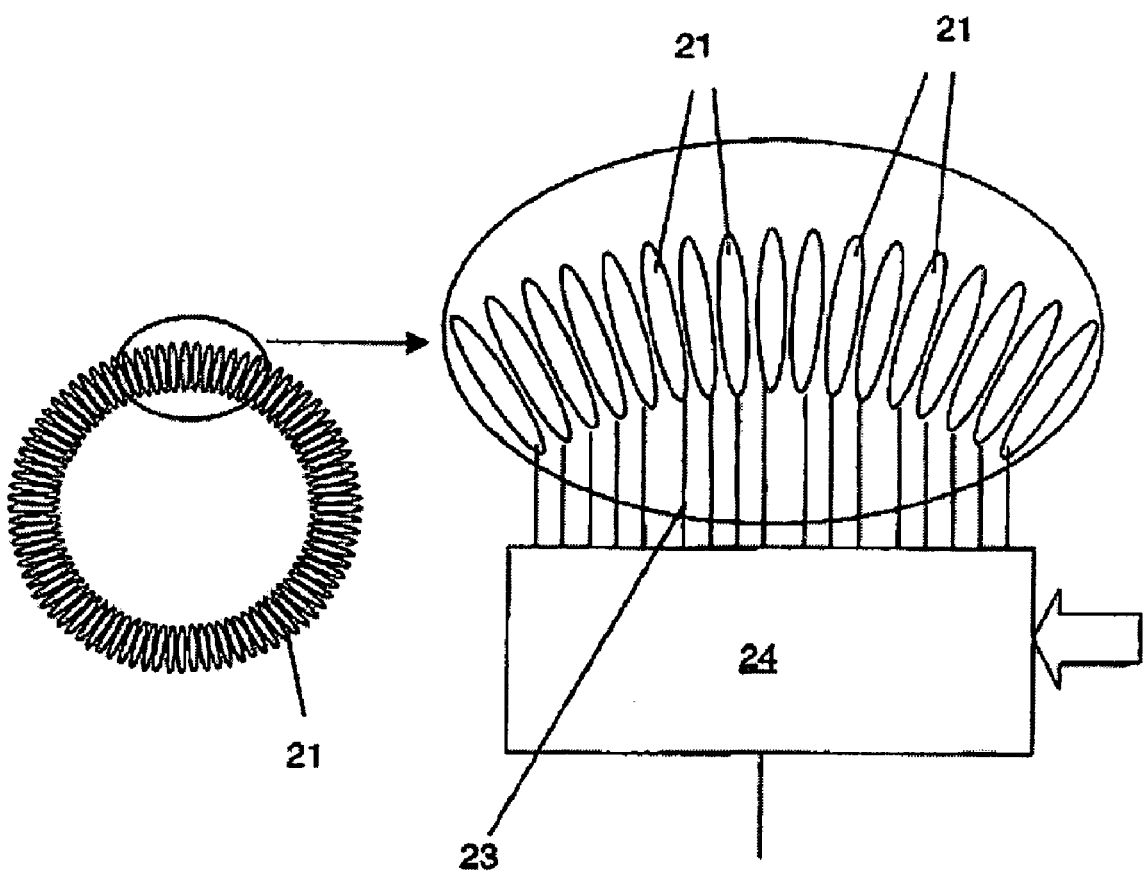

The invention is further explained below by means of a embodiment depicted in the drawing. In the drawing FIG. 1 shows a materialized measure of the device for measuring the rotational angle, FIG. 2 shows the sensing device of the device, FIG. 3 shows an enlarged cutout of the sensing device and FIGS. 4–6 show a variant of the device in an axial section and its assembly.

In order to determine the rotational angle position of two components that can be rotated relative to each other, for example, the rotational angle position of a motor shaft, an optical rotation sensor is used. A materialized measure is coupled to rotate in unison with the one component, for example, the motor shaft, which is illuminated by a light source. The light of the light source, modulated in intensity by the materialized measure, is received by a sensing device and converted to angular position signals.

In the depicted embodiment, the materialized measure 10 consists of a light-transparent circular disk 11, on which an angular lattice structure 12 is applied centrally relative to the center point. The angular lattice structure 12 consists of radially running sectors with the same mutual angular spacing and the same angular width, with transparent and non-transparent sectors alternating in the circumferential direction. Marker elements 13 and 14 are also applied to disk 11. The marker elements 13 and 14 are formed by irregularities of the angular lattice structure 12. In the depicted embodiment, the marker elements 13 and 14 are non-transparent sectors that have a greater angular width than the sectors of the angular lattice structure 12. The marker elements 13 and 14 are offset relative to each other by an angle in the circumferential direction that is somewhat less than 180°, for example, between 160° and 170°.

The sensing device 20 has a circular track of optical sensor elements 21 spaced apart from each other at an angle. The outer radius of the track of sensor elements 21 is somewhat smaller than the outer radius of the angular lattice structure 12 of the materialized measure 10. The sensor elements 21 are preferably photodiodes formed in a semiconductor chip 22. The sensor elements 21 have a light-sensitive surface that has roughly the shape of a radially-aligned ellipse. Because of this, a sinusoidal curve of the surface of the sensor elements 21 that are covered by the sectors of the angular lattice structure 21 during rotation of disk 11 results in known fashion. Signals of the sensor elements 21 are taken off in angle regions of the circular track offset by 90°, to produce incremental angle signals offset in phase relative to each other by 90°. By evaluation of these sine, cosine, negative sine and negative cosine signals, eccentricity errors of the materialized measure 10 or of its angular lattice structure 12 relative to sensing device 20 or to the track of its sensor elements 21 can be compensated for by calculation.

Each individual sensor element 21 is connected via lines 23 formed in the semiconductor chip 22 to a multiplex circuit 24, also formed in the semiconductor chip 22. Each sensor element 21 can be individually polled via multiplex circuit 24 in order to determine the angular position of the marker elements 12 and 13 [sic; 13 and 14] with reference to the angle division of the sensor elements 21. Since the marker elements 13 and 14 in the materialized measure 10 have a defined angular spacing relative to each other, it can be checked in the sensing signals of sensor elements 21 produced by the marker elements 13 and 14 whether these have the same angular spacing as the marker elements 13 and 14. A deviation of the angular spacing of sensor elements 21 in which the signal of the marker elements 13 and 14 is generated from the angular spacing of the marker elements 13 and 14 in the materialized measure 10 indicates that the materialized measure 10 has inadmissibly large centering errors relative to sensing device 20. Centering errors that are smaller than this tolerance do not adversely affect function of the rotation sensor, and in particular, do not lead to an incorrect measured value of absolute angle.

During operation of the device, generally at the beginning, the absolute angle measured value of the materialized measure 10 is determined with reference to the sensing device 20 by means of marker elements 13 and 14 and sensor elements 21. The angular position is then counted incrementally from this absolute angle value over the angular lattice structure 12 and the sensor elements 21.

A design variant of the device is shown as an example in FIGS. 4–6.

For example, the actual rotational angle position of a motor shaft 50, for example, of an electric motor, is to be determined for a servo drive. For this purpose, the angular position of the motor shaft 50 must be determined with reference to the motor housing 51. The motor shaft 50 is rotatable by means of a radial ball bearing 52 in the motor housing 51. The radial ball bearing 52 has bearing tolerances from which the centricity tolerances of the motor shaft 50 relative to motor housing 51 are obtained.

A light source 31 is positioned centrally In a hollow cylindrical bushing 30. Disk 11 of the materialized measure 10 is mounted axially at a spacing relative to light source 31 on the front side of bushing 30. The inside diameter of bushing 30 then corresponds to the outside diameter of the angular lattice structure 12. The entire angular lattice structure 12 of disk 11 is uniformly illuminated with parallel light directed by light source 31, for which purpose a collimator lens 32 is arranged in the light path between the light source 31 and disk 11. The collimator lens 32 can also be constructed on disk 11. The bushing 30 is carried by a shaft stub 33 arranged coaxially on the end of bushing 30 opposite disk 11. The shaft stub 33 is designed as an expansion shaft with axially running springs. The shaft stub 33 is inserted coaxially into a blind hole 53 of motor shaft 50, and because of this is force-fit into motor shaft 50 axially and is also fixed in the rotational direction.

The sensing device 20 is arranged in a cap 40 depicted in FIG. 6, which in the installed state seals and encapsulates the rotational sensor relative to the external surroundings. The cap 40 has a flange 41 that is supported against the motor housing 51. Screws 42 pass through flange 41 and are tightened into threaded holes 54 of motor housing 51.

A circuit board 43, which carries the semiconductor chip 22 with the sensor elements 21 on the side facing the materialized measure 10, is arranged in cap 40. The power supply for the semiconductor chip 22 and control and signal processing are via the circuit board 43.

In order for the light source 31 to be able to rotate with motor shaft 50 and materialized measure 10, the light source 31 is supplied with power in contactless fashion. For this purpose, an inductive current feed is used, via a coil 44 arranged fixed in cap 40, to a coil 34 situated in sleeve 30 and rotating with it.

To mount the rotation sensor on the motor, a tool 60 is used that is depicted in FIGS. 4 and 5. The tool 60 has the shape of a cap, which essentially corresponds to cap 40. The tool 60 has a cylindrical inside cavity 61 into which the bushing 30 is inserted. The inside cavity 61 has an internal cone 62 on its open face, against which an outer cone 35 of bushing 30 abuts. Because of this, the bushing 30 assumes a radially and in particular an axially defined position in tool 60.

The bushing 30 with its shaft stub 33 is then forced into the blind hole 53 of motor shaft 50 by means of tool 60, as shown in FIGS. 4 and 5 and marked by an arrow. When forced in, the shaft stub 33 penetrates axially into the blind hole 53 of the motor shaft 50 so that stop edge 63 of tool 60 comes to rest against motor housing 51. Because of the force-fit seating of the shaft stub 33 in blind hole 53, the bushing 30, and therefore the disk 11 of the materialized measure 10, therefore has an exact, axially defined position with reference to the motor housing 51.

The tool 60 is now removed and the cap 40 mounted with its scanning device 20. The flange 41 of cap 40 then comes to rest at the same position on the motor housing 51 as the stop edge 63 of tool 60 did. This guarantees that the sensing device 20 with sensor elements 21 is axially aligned with reference to the same surface of the motor housing 51 on which the disk 11 of materialized measure 10 was axially aligned by means of tool 60. Because of this, precise axial alignment of the materialized measure 10 with reference to the sensing device 20 is obtained.

Centering of the materialized measure 10 with reference to the sensing device 20 in the radial direction is produced by the radial ball bearing of the motor shaft 50 in motor housing 51, i.e., by the bearing tolerance of radial ball bearing 52. This centering tolerance is accommodated by the configuration of the rotation sensor according to the invention.

LIST OF REFERENCE NUMBERS

10 Materialized measure
11 Disk
12 Angular lattice structure
13 Marker element
14 Marker element
20 Sensing device
21 Sensor elements
22 Semiconductor chip
23 Lines
24 Multiplex circuit
30 Bushing
31 Light source
32 Collimator lens
33 Shaft stub
34 Coil
35 Outer cone
40 Cap
41 Flange
42 Screws
43 Circuit board
44 Coil
50 Motor shaft
51 Motor housing
52 Radial ball bearing
53 Blind hole
54 Threaded hole
60 Tool
61 Internal cavity
62 Internal cone
63 Stop edge

The invention claimed is:

1. Device for measurement of a rotational angle of two components that can be rotated relative to each other, with a bushing and shaft stub (30, 33) that can be coupled to rotate in unison with a first component (50), with a materialized measure (10) connected coaxially and rotating in unison with bushing and shaft stub (30, 33), and with a sensing device (20) that optically senses the materialized measure (10) connected to rotate in unison with a second component (51), characterized by the fact that the materialized measure (10) has an angular lattice structure (12), that the sensing device (20) has a circular track of optical sensor elements (21) spaced apart at an angle and arranged coaxially to bushing and shaft stub (30, 33), that a light source (31) is arranged coaxially in bushing and shaft stub (30, 33), that the light source (31) illuminates the materialized measure (10), that the sensing device (20) is arranged on the side of the materialized measure (10) opposite light source (31), that the shaft stub (33) is inserted coaxially into the first component (50), that the shaft stub (33) is inserted axially alignable in the first component (50), that the sensing device (20) is arranged in a cap (40) mountable on the second component (51), and that an inductive current is fed to the light source (31) via a coil (44) arranged in cap (40) to a coil (34) in bushing and shaft stub (30, 33), and rotating therewith.

2. Device according to claim 1, characterized by the fact that a marker element (13) connected to rotate in unison with bushing and shaft stub (30, 33) influences the light impinging on sensor elements (21) according to its angular position for at least one sensor element (21) associated with this angular position, that the sensor elements (21) can be electronically polled, and the marker element (13) and the materialized measure (10) are formed on a common disk (11).

3. Device according to claim 2, characterized by the fact that the materialized measure (10) has an angular lattice structure (12) with equidistant angle division and the marker element (13) is formed by an irregularity of this angle division.

4. Device according to claim 1, characterized by the fact that at least a second marker element (14) is provided, which is arranged offset at an angle relative to a first marker element (13).

5. Device according to claim 4, characterized by the fact that the marker elements (13, 14) are offset relative to each other at an angle different from 180° that lies close to 180°.

6. Device according to claim 1, characterized by the fact that the materialized measure (10) generates in the optical sensor elements (21) at least an incrementally counted sine signal and a cosine signal phase-shifted by 90° relative to it.

7. Device according to claim 6, characterized by the fact the signals generated by the materialized measure (10) in the optical sensor elements (21) are sensed at angular positions of the circular track which are offset relative to each other by 90°.

8. Device according to claim 1, characterized by the fact that the sensor elements (21) are individually polled by a multiplex circuit (24).

9. Device according to claim 1, characterized by the fact that the shaft stub (33) is designed as an expanding shaft and is inserted with a force-fit into a blind hole (53) of the first component (50).

10. Device according to claim 1, characterized by the fact that the bushing and shaft stub (30, 33) with the materialized measure (10) is pressed into the first component (50) and is axially aligned by means of tool (60) corresponding to this cap (40).

11. Device according to claim 1, characterized by the fact that the first component is a motor shaft (50) of a motor and the second component is a motor housing (51) of the motor.

* * * * *